US008692113B2

(12) United States Patent
Huang et al.

(10) Patent No.: US 8,692,113 B2
(45) Date of Patent: Apr. 8, 2014

(54) CONNECTOR ASSEMBLY

(75) Inventors: Chao-Jui Huang, New Taipei (TW); Wen-Nan Huang, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 330 days.

(21) Appl. No.: 13/232,947

(22) Filed: Sep. 14, 2011

(65) Prior Publication Data

US 2013/0065423 A1 Mar. 14, 2013

(51) Int. Cl.
*H02G 3/04* (2006.01)
*H01R 4/24* (2006.01)

(52) U.S. Cl.
USPC .......... 174/68.1; 174/113 R; 439/391; 439/98

(58) Field of Classification Search
USPC ........ 174/50, 135, 68.1, 68.3, 74 R, 78, 88 R, 174/71 R, 113 R; 439/391, 83, 92, 498, 502, 439/620.01, 607.41, 947, 606, 581, 607.1, 439/901, 497, 98
See application file for complete search history.

(56) References Cited

U.S. PATENT DOCUMENTS

| | | | | | |
|---|---|---|---|---|---|
| 2,386,177 | A * | 10/1945 | Andersen | 439/901 |
| 6,948,977 | B1 * | 9/2005 | Behrent | 439/581 |
| 7,137,848 | B1 * | 11/2006 | Trout et al. | 439/947 |
| 7,452,238 | B1 * | 11/2008 | Wu | 439/606 |
| 7,534,143 | B1 * | 5/2009 | Tsao et al. | 439/607.41 |
| 7,744,414 | B2 * | 6/2010 | Scherer et al. | 439/607.1 |
| 8,192,232 | B2 * | 6/2012 | Whiteman et al. | 439/620.01 |
| 8,226,432 | B2 * | 7/2012 | Hsueh et al. | 439/497 |

* cited by examiner

*Primary Examiner* — Angel R Estrada
(74) *Attorney, Agent, or Firm* — Chun-Ming Shih; HDLS IPR Services

(57) ABSTRACT

The connector assembly for a printed circuit board includes a set of differential signal wires, a set of alternating current (AC) power wires, a ground wire, and a connector. The set of differential signal wires includes a plurality of signal wires, and each of the signal wires has an insulator and a conductor. The set of AC power wires includes a plurality of power wires, and each of the power wires has an insulator and a conductor. The connector includes an insulated shell and a plurality of conductive pins received therein, and each of the conductive pins has a nipper. An end of each of the set of differential signal wires and the set of AC power wires is electrically connected to the printed circuit board, and the other end thereof is electrically connected to the nipper.

17 Claims, 6 Drawing Sheets

CONNECTOR ASSEMBLY

BACKGROUND OF THE INVENTION

1. Technical Field

The invention relates to connectors, particularly to connectors with power and signal transmission.

2. Related Art

Solar power is a green energy and becomes more and more important.

A solar power generator needs power wires and signal wires. Traditionally, power wires and signal wires are separately arranged. That is, signal wires and power wires use independent and distinct connectors. It causes waste of time and cost.

Especially in outdoor environment, separate arrangement of power and signal wires will cause more serious waste due to additional water-proof mechanisms. The PLC (power line communication) requires complicated and expensive communication hardware. If a wireless communication system such as ZigBee is applied, the reliability of communication will be reduced.

SUMMARY OF THE INVENTION

An object of the invention is to provide a connector assembly which combines power wires with signal wires.

Another object of the invention is to provide a connector assembly, which combines multiple connector units to decrease the number of soldering holes in a printed circuit board.

To accomplish the above objects, the connector assembly for a printed circuit board includes a set of differential signal wires, a set of alternating current (AC) power wires, a ground wire, and a connector. The set of differential signal wires includes a plurality of signal wires, and each of the signal wires has an insulator and a conductor. The set of AC power wires includes a plurality of power wires, and each of the power wires has an insulator and a conductor. The connector includes an insulated shell and a plurality of conductive pins received therein, and each of the conductive pins has a nipper. An end of each of the set of differential signal wires and the set of AC power wires is electrically connected to the printed circuit board, and the other end thereof is electrically connected to the nipper.

DETAILED DESCRIPTION OF THE INVENTION

Figure 1:
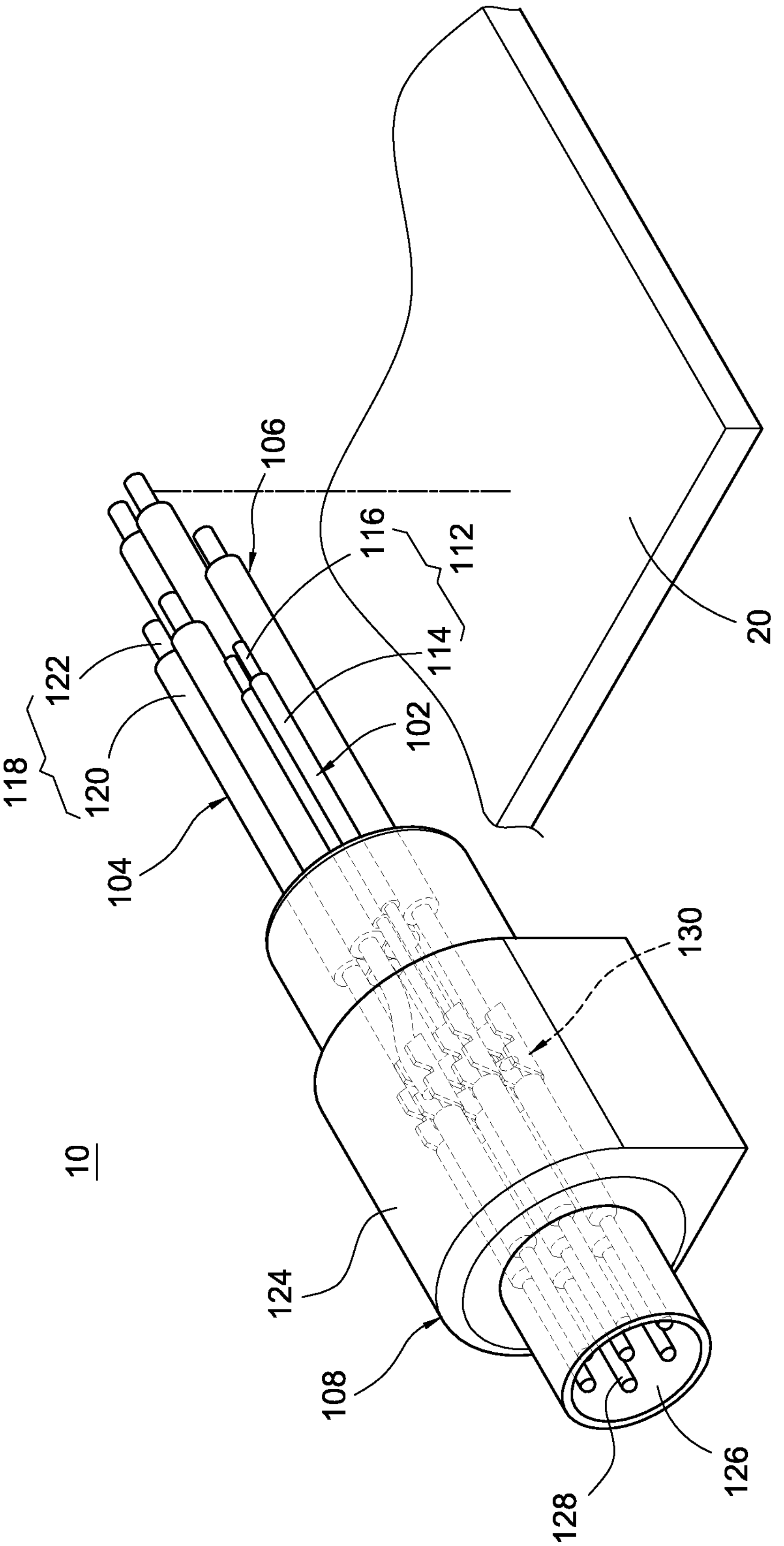
FIG. 1 is a perspective view of the first embodiment of the invention.
Figure 2:
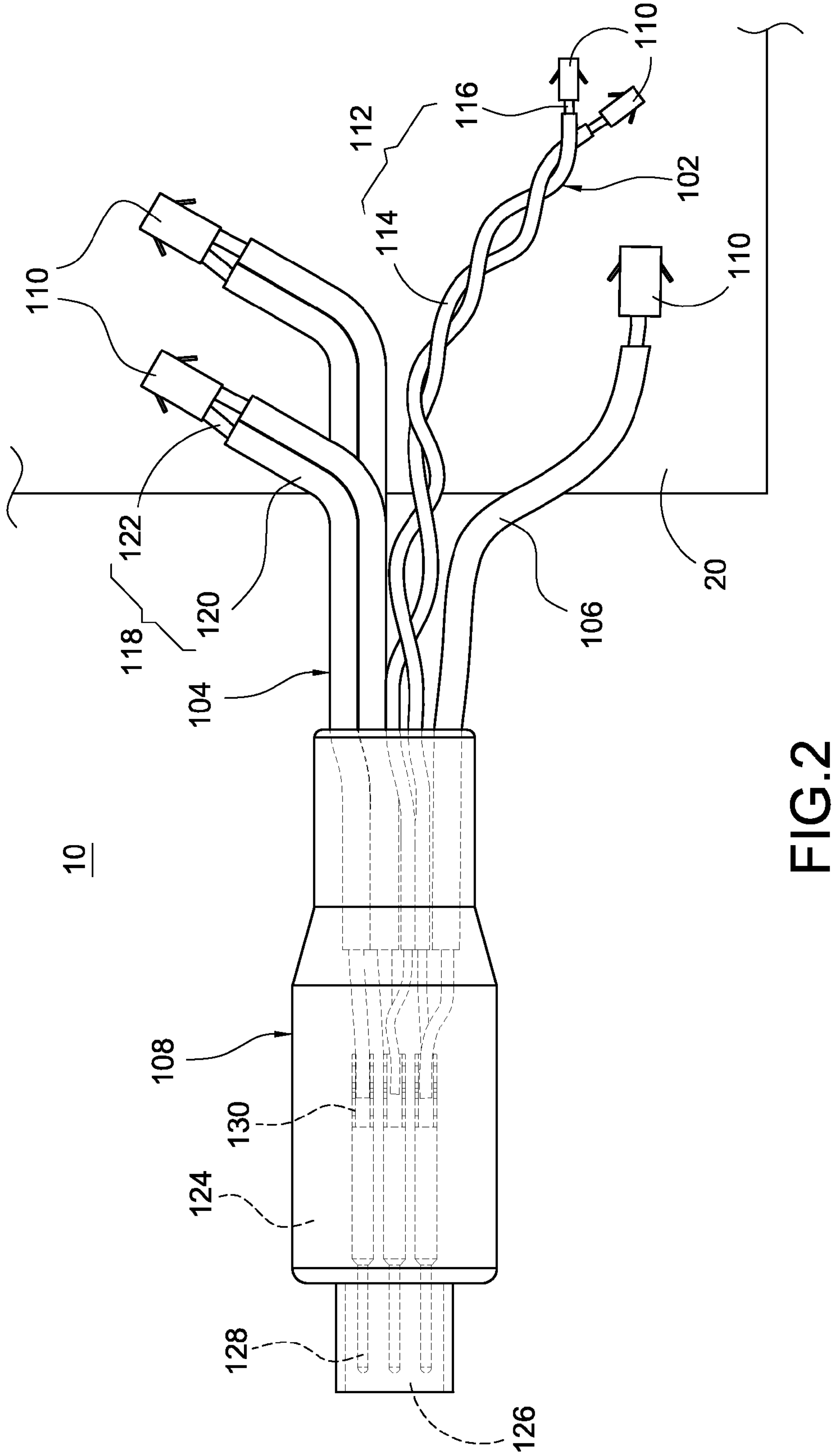
FIG. 2 is a top view of the first embodiment of the invention.
Figure 3:
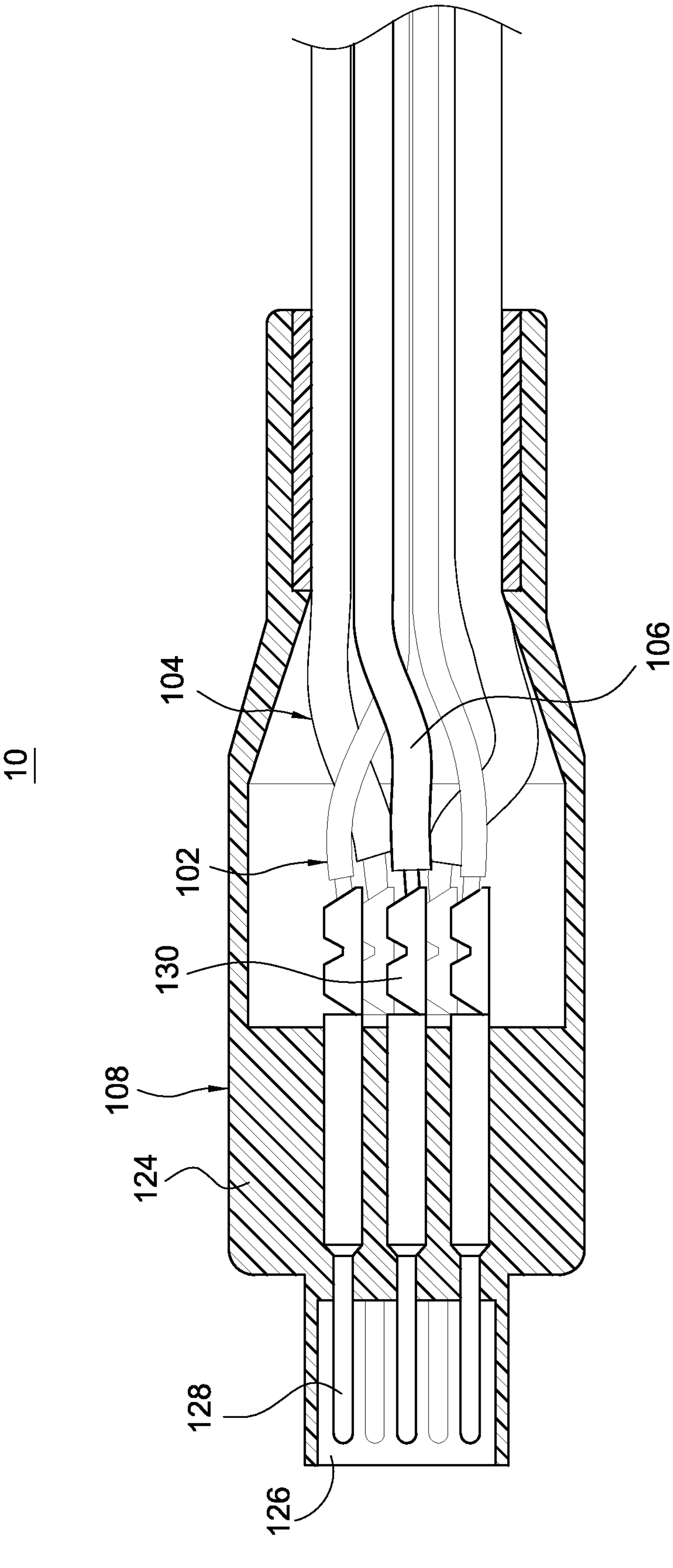
FIG. 3 is a sectional view of the first embodiment of the invention.

Please refer to FIGS. 1-3. The connector assembly 10 of the first embodiment of the invention includes a set of differential signal (DS) wires 102, a set of alternating current (AC) power wires 104, a ground wire 106, a connector 108 and a plurality of metal plugs 110.

The set of DS wires 102 includes signal wires 112. Each of the signal wires 112 includes an insulator 114 and a conductor 116. The insulator 114 surrounds the conductor 116.

The set of AC wires 104 includes power wires 118. Each of the power wires 118 includes an insulator 120 and a conductor 122. The insulator 120 surrounds the conductor 122.

The connector 108 includes an insulated shell 124, an inlet hole 126 and a plurality of conductive pins 128. The insulated shell 124 surrounds the conductive pins 128. The inlet hole 126 is located at one side of the insulated shell 124. Each of the conductive pins 128 includes a nipper 130.

One end of each of the set of DS wires 102, the set of AC wires 104 and the ground wire 106 is electrically connected to the PCB 20. The other end of each of the set of DS wires 102, the set of AC wires 104 and the ground wire 106 is electrically connected to the nippers 130.

The metal plugs 110 are used for being fastened in soldering holes of the printed circuit board 20. This can reinforce the soldering strength between the connector assembly 10 and the PCB 20.

The metal plugs 110 are separately fastened to the signal wires 112, power wires 118 and ground wire 106, and electrically connected to the PCB 20.

The power wires 118 are arranged in pairs to separately connect one of the metal plugs 110. This can decrease the number of soldering holes of the PCB 20. The signal wires 112 are intertwined with each other to enhance the EMS (Electromagnetic Susceptibility).

The signal wires 112, power wires 118 and conductive pins 128 are two, four and seven in number, respectively. The conductive pins 128 are separately connected to the two signal wires 112, four power wires 118 and ground wire 106.

Figure 4:
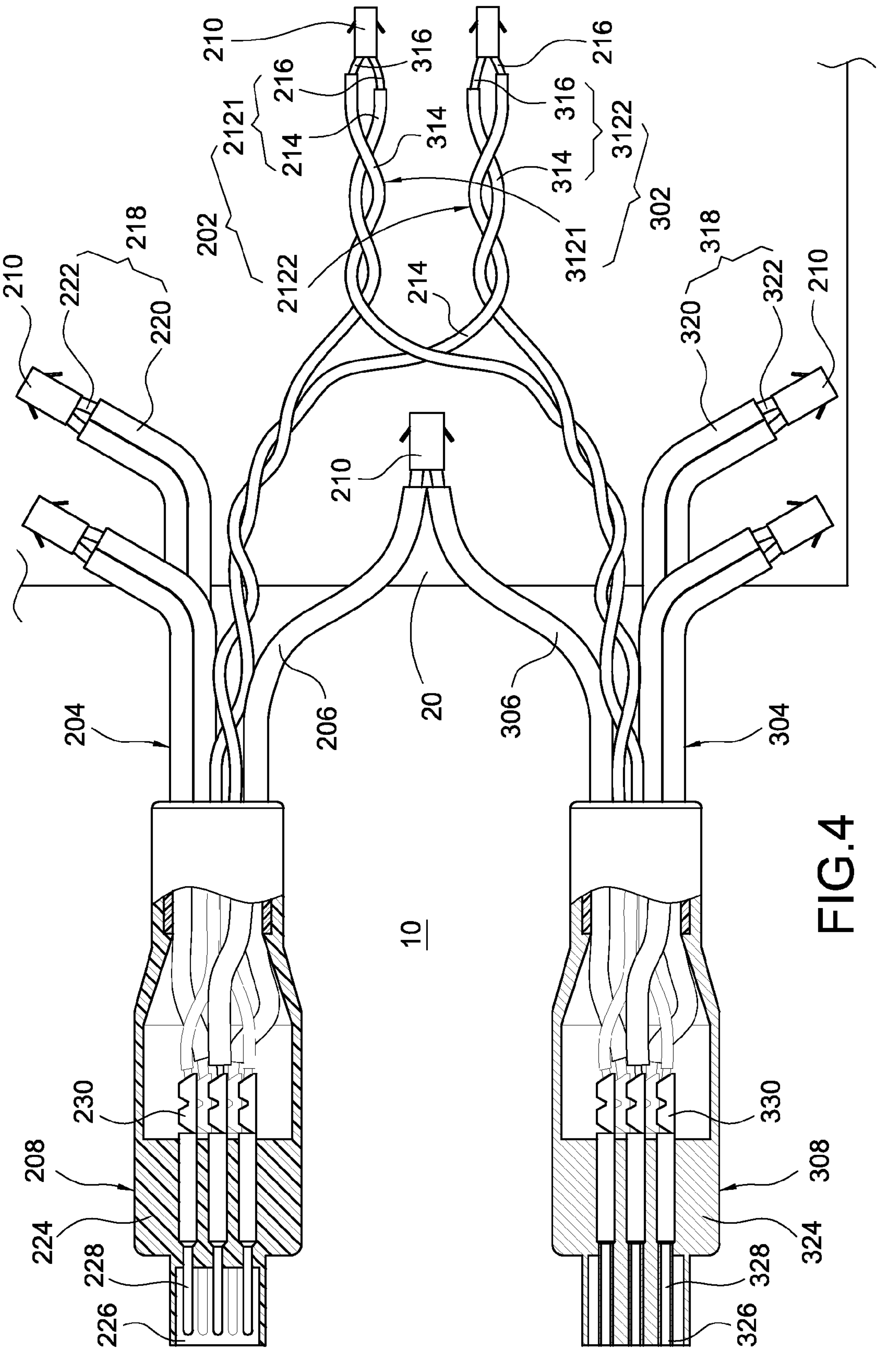
FIG. 4 is a top view of the second embodiment of the invention.

Please refer to FIG. 4. The connector assembly 10 of the second embodiment of the invention includes a PCB (not shown), a first set of differential signal (DS) wires 202, a first set of alternating current (AC) power wires 204, a first ground wire 206, a first connector 208, metal plugs 210, a second set of DS wires 302, a second set of AC power wires 304, a second ground wire 306 and a second connector 308.

The first set of DS wires 202 includes a first signal wire 2121 and a second signal wire 2122. The first signal wire 2121 includes an insulator 214 and a conductor 216. The insulator 214 surrounds the conductor 216. The second signal wire 2122 includes an insulator 214 and a conductor 216. The insulator 214 surrounds the conductor 216.

The first set of AC wires 204 includes first power wires 218. Each of the first power wires 218 includes an insulator 220 and a conductor 222. The insulator 220 surrounds the conductor 222.

The first connector 208 includes an insulated shell 224, an inlet hole 226 and a plurality of conductive pins 228. The insulated shell 224 surrounds the conductive pins 228. The inlet hole 226 is located at one side of the insulated shell 224. Each of the conductive pins 228 includes a first nipper 230.

The second set of DS wires 302 includes a third signal wire 3121 and a fourth signal wire 3122. The third signal wire 3121 includes an insulator 314 and a conductor 316. The insulator 314 surrounds the conductor 316. The fourth signal wire 3122 includes an insulator 314 and a conductor 316. The insulator 314 surrounds the conductor 316.

The second set of AC wires 304 includes second power wires 318. Each of the second power wires 318 includes an insulator 320 and a conductor 322. The insulator 320 surrounds the conductor 322.

The second connector 308 includes an insulated shell 324, an inlet hole 326 and a plurality of conductive pins 328. The insulated shell 324 surrounds the conductive pins 328. The inlet hole 326 is located at one side of the insulated shell 324. Each of the conductive pins 328 includes a second nipper 330.

One end of each of the first set of DS wires 202, the first set of AC wires 204 and the first ground wire 206 is electrically connected to the PCB 20. The other end of each of the first set of DS wires 202, the first set of AC wires 204 and the first ground wire 206 is electrically connected to the first nippers 230.

One end of each of the second set of DS wires 302, the second set of AC wires 304 and the second ground wire 306 is electrically connected to the PCB 20. The other end of each of the second set of DS wires 302, the second set of AC wires 304 and the second ground wire 306 is electrically connected to the second nippers 330.

The first ground wire 206 and the second ground wire 306 are connected together and then electrically connected to the PCB 20. This can decrease the number of soldering holes of the PCB 20.

The first signal wire 2121 and the third signal wire 3121 are connected together and then electrically connected to the PCB 20. This can decrease the number of soldering holes of the PCB 20.

The second signal wire 2122 and the fourth ground wire 3122 are connected together and then electrically connected to the PCB 20. This can decrease the number of soldering holes of the PCB 20.

The metal plugs 210 are used for being fastened in soldering holes of the PCB 20. This can reinforce the soldering strength between the connector assembly 10 and the PCB 20.

The metal plugs 210 are separately fastened to the first signal wire 2121 with the third signal wire 3121, the second signal wire 2122 with the fourth signal wire 3122, the first power wires 218, the second power wires 318 and the ground wires 206, 306 and electrically connected to the PCB 20.

The first power wires 218 are arranged in pairs to connect one of the metal plugs 210. This can decrease the number of soldering holes of the PCB 20.

The second power wires 318 are arranged in pairs to connect one of the metal plugs 210. This can decrease the number of soldering holes of the PCB 20.

The first signal wire 2121 and the second signal wire 2122 are intertwined with each other, and the third signal wire 3121 and the fourth signal wire 3122 are intertwined with each other. This can enhance the EMS (Electromagnetic Susceptibility).

The first power wires 218 and the first conductive pins 228 are four and seven in number, respectively. The first conductive pins 228 are separately connected to the first signal wire 2121, the second signal wire 2122, the first power wires 118 and the first ground wire 206.

The second power wires 318 and the second conductive pins 328 are four and seven in number, respectively. The second conductive pins 328 are separately connected to the third signal wire 3121, the fourth signal wire 3122, the second power wires 318 and the second ground wire 306.

The first connector 208 and the second connector 308 are male and female, respectively.

Figure 5:
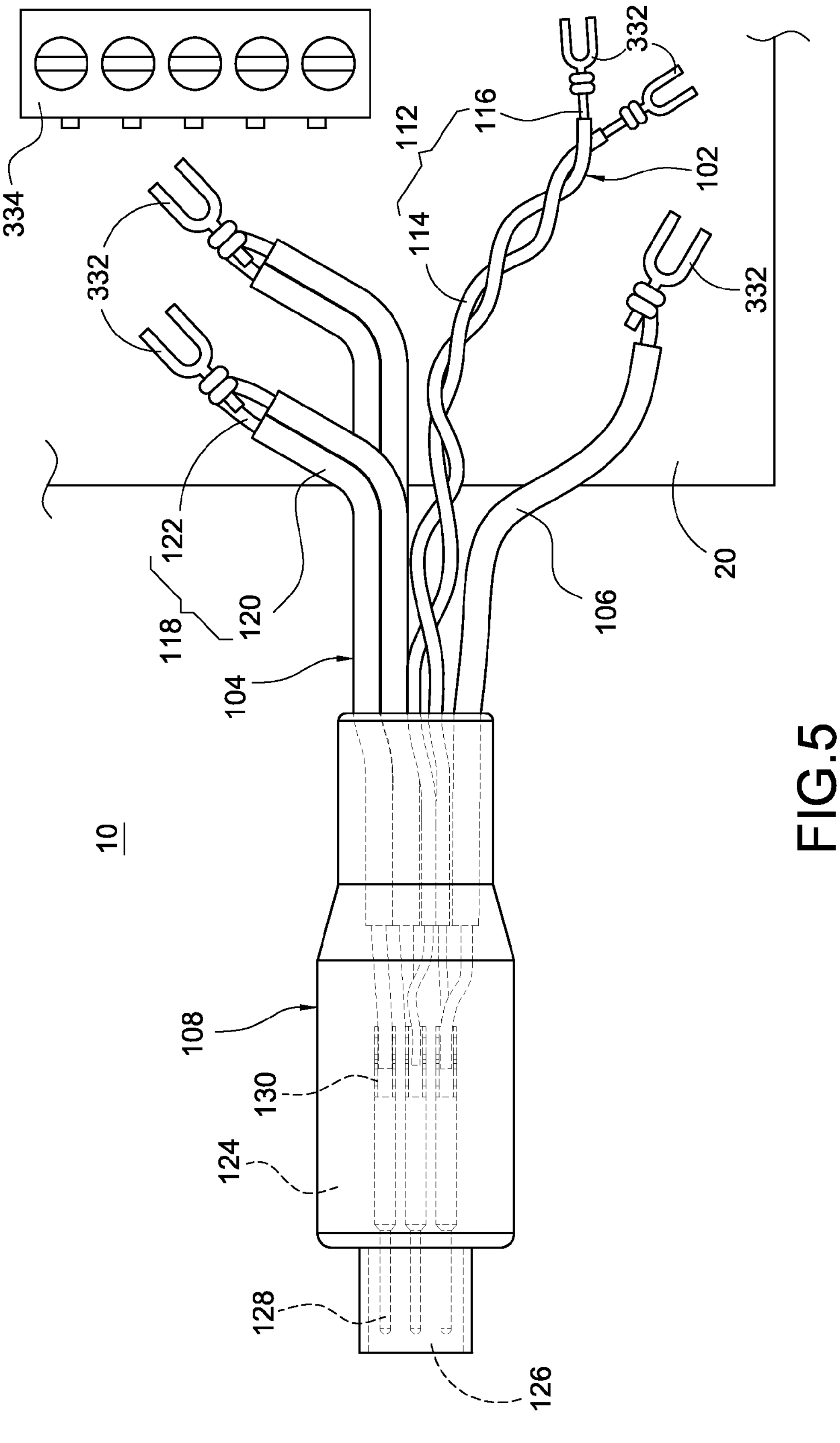
FIG. 5 is a top view of the third embodiment of the invention.

Please refer to FIG. 5, which is similar to FIG. 2. The connector assembly 10 shown in this figure further includes a plurality of Y-terminals 332 which replace the metal plugs 110. The Y-terminals 332 are separately fastened to the signal wires 112, power wires 118 and ground wire 106 to connect the PCB 20.

The PCB 20 further includes a PCB connector 334 for connecting the signal wires 112, power wires 118 and ground wire 106.

Figure 6:
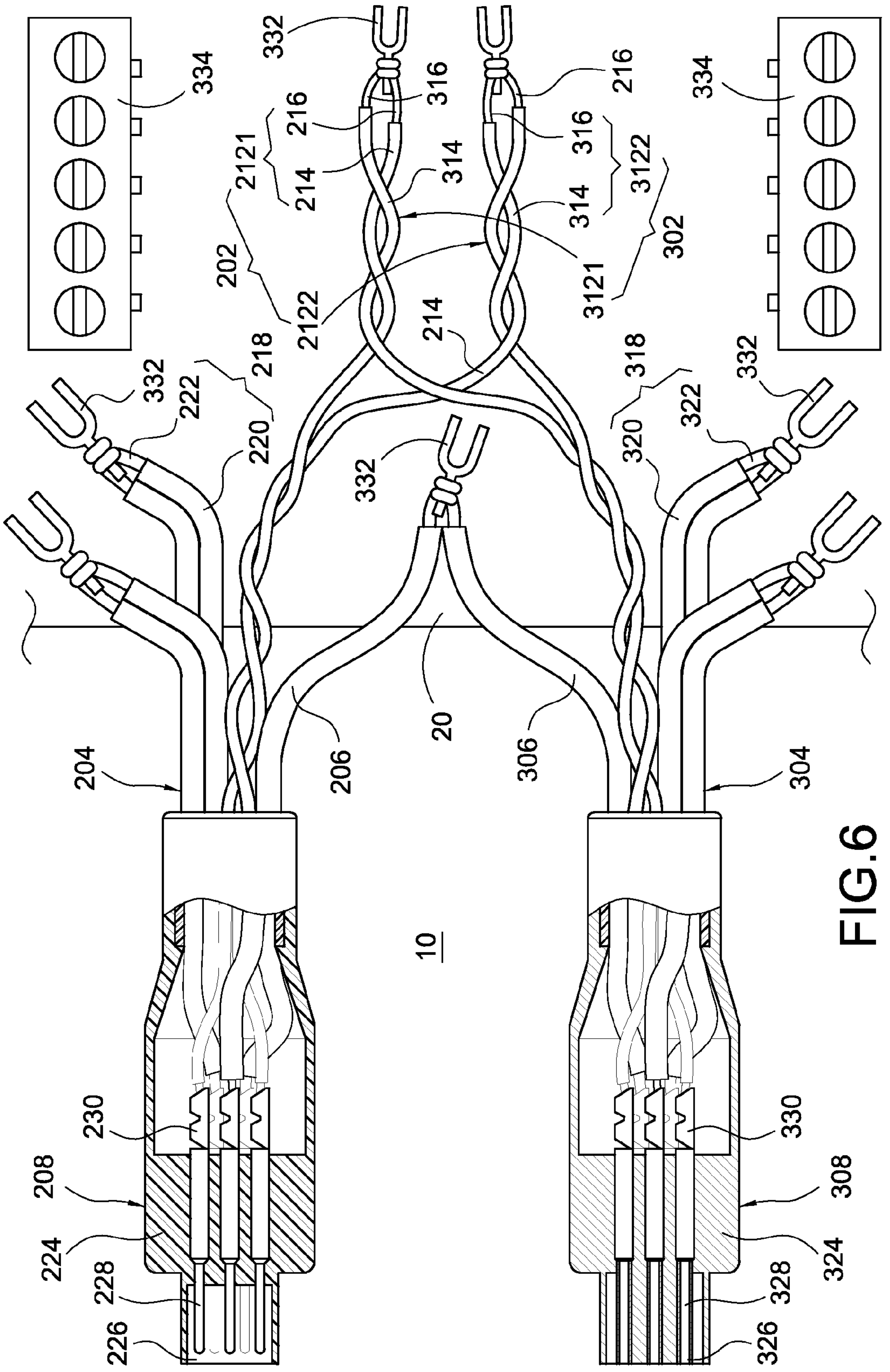
FIG. 6 is a top view of the fourth embodiment of the invention.

Please refer to FIG. 6, which is similar to FIG. 4. The connector assembly 10 shown in this figure further includes a plurality of Y-terminals 332 which replace the metal plugs 210. The Y-terminals 332 are separately fastened to the signal wires 2121, 3121, 2122, 3122, power wires 218, 318 and ground wires 206, 306 to connect the PCB 20.

The PCB 20 further includes a PCB connector 334 for connecting the signal wires 2121, 3121, 2122, 3122, power wires 218, 318 and ground wires 206, 306.

It will be appreciated by persons skilled in the art that the above embodiments have been described by way of example only and not in any limitative sense, and that various alterations and modifications are possible without departure from the scope of the invention as defined by the appended claims.

What is claimed is:

1. A connector assembly for a printed circuit board (PCB), the connector assembly consisting of:
- a single wire tube;
- a set of differential signal wires disposed in the single wire tube, comprising a plurality of signal wires, and each of the signal wires having an insulator and a conductor;
- a set of alternating current (AC) power wires disposed in the single wire tube, comprising a plurality of power wires, and each of the power wires having an insulator and a conductor;
- a ground wire disposed in the single wire tube;
- a plurality of connecting members separately fastened to the signal wires, the power wires and the ground wire and connected to the PCB; and
- a connector, comprising an insulated shell extended from one end of the single wire tube and a plurality of conductive pins received therein, and each of the conductive pins having a nipper;
- wherein an end of each of the set of differential signal wires and the set of AC power wires is electrically connected to the PCB via the connecting member, and the other end of each of the set of differential signal wires and the set of AC power wires is fixed on the nipper.

2. The connector assembly of claim 1, wherein the connecting members are a plurality of metal plugs.

3. The connector assembly of claim 2, wherein the power wires are arranged in pairs, and a pair of the power wires connects to one of the metal plugs.

4. The connector assembly of claim 1, wherein the signal wires are intertwined.

5. The connector assembly of claim 1, wherein the signal wires, the power wires and the conductive pins are two, four and seven in number, respectively.

6. The connector assembly of claim 5, wherein the conductive pins are separately connected to the two signal wires, the four power wires and the ground wire.

7. The connector assembly of claim 1, wherein the connecting members are a plurality of Y-terminals.

8. The connector assembly of claim 7, wherein the PCB further comprises a PCB connector connecting the signal wires, the power wires and the ground wire through the Y-terminals.

9. A connector assembly for a printed circuit board (PCB), the connector assembly comprising:
- a first set of differential signal (DS) wires comprising a first signal wire and a second signal wire, the first signal wire having an insulator and a conductor, and the second signal wire having an insulator and a conductor;

a first set of alternating current (AC) wires, comprising first power wires, and each of the first power wires having an insulator and a conductor;

a first ground wire;

a first connector, comprising an insulated shell and a plurality of conductive pins, the insulated shell surrounding the conductive pins, and each of the conductive pins 228 having a first nipper;

a second set of DS wires, comprising a third signal wire and a fourth signal wire, the third signal wire having an insulator and a conductor, and the fourth signal wire having an insulator and a conductor;

a second set of AC wires, comprising second power wires, each of the second power wires having an insulator and a conductor;

a second ground wire; and a second connector, comprising an insulated shell and a plurality of conductive pins, the insulated shell surrounding the conductive pins, and each of the conductive pins having a second nipper;

wherein one end of each of the first set of DS wires and the first set of AC wires is electrically connected to the PCB, the other end of each of the first set of DS wires and the first set of AC wires is electrically connected to the first nippers, one end of each of the second set of DS wires and the second set of AC wires is electrically connected to the PCB, and the other end of each of the second set of DS wires and the second set of AC wires is electrically connected to the second nippers, the first ground wire and the second ground wire are connected together, the first signal wire and the third signal wire are connected together, and the second signal wire and the fourth ground wire are connected together.

10. The connector assembly of claim 9, further comprising metal plugs separately fastened to the first signal wire with the third signal wire, the second signal wire with the fourth signal wire, the first power wires, the second power wires and the first and second ground wires and electrically connected to the PCB.

11. The connector assembly of claim 10, wherein the first power wires and the second power wires are arranged in pairs to separately connect one of the metal plugs, and the second power wires are arranged in pairs to separately connect one of the metal plugs.

12. The connector assembly of claim 9, wherein the first signal wire and the second signal wire are intertwined with each other, the third signal wire and the fourth signal wire are intertwined with each other, the first signal wire and the third signal wire are intertwined with each other, and the second signal wire and the fourth signal wire are intertwined with each other.

13. The connector assembly of claim 9, wherein the first power wires and the first conductive pins are four and seven in number respectively, and the first conductive pins are separately connected to the first signal wire, the second signal wire, the first power wires and the first ground wire.

14. The connector assembly of claim 9, wherein the second power wires and the second conductive pins are four and seven in number respectively, and the second conductive pins are separately connected to the third signal wire, the fourth signal wire, the second power wires and the second ground wire.

15. The connector assembly of claim 9, wherein the first connector and the second connector are male and female, respectively.

16. The connector assembly of claim 9, further comprising Y-terminals separately fastened to the first signal wire with the third signal wire, the second signal wire with the fourth signal wire, the first power wires, the second power wires, the first ground wire, and the second ground wire and connected to the PCB.

17. The connector assembly of claim 16, wherein the PCB further comprises a PCB connector connecting the first signal wire with the third signal wire, the second signal wire with the fourth signal wire, the first power wires, the second power wires, the first ground wire, and the second ground wire and connected to the PCB.

* * * * *